United States Patent Office 2,898,319
Patented Aug. 4, 1959

2,898,319

POLYMERIC VINYL ESTERS PLASTICIZED WITH DIALIPHATIC ESTERS OF CERTAIN ALKYLIDENE DIBENZOIC ACIDS

John C. Petropoulos, South Norwalk, Conn., assignor to American Cyanamid Company, New York, N.Y., a corporation of Maine No Drawing. Application January 8, 1957
Serial No. 632,971

10 Claims. (Cl. 260—31.8)

The present invention relates to a novel composition of matter comprising polymers and copolymers of vinyl esters plasticized with dialiphatic alcohol esters of dicarboxylic acids having the following general formula:

$$\text{HOOC}\underset{}{\underset{}{\bigcirc}}\left[\underset{R'}{\overset{R}{\underset{|}{C}}}\right]_n\underset{}{\bigcirc}\text{COOH}$$

wherein R and R' are alkyl groups containing from 1 to 4 carbon atoms and n is a whole number between 1 and 2, inclusive.

Still further, the present invention relates to dialiphatic esters per se and a process for producing the same.

The alcohols employed to produce the dialiphatic esters of the present invention are preferably monohydric aliphatic alcohols containing between 1 and 18 carbon atoms, and more preferably between 4 and 12 carbon atoms.

Still further, the present invention relates to plasticizing of polymers and copolymers of vinyl chloride with dialiphatic esters of certain alkylidenedibenzoic acids, and to the products thus produced.

An object of the present invention is to provide plasticized polymers and copolymers of vinyl esters, and more particularly plasticized polyvinyl chloride and/or copolymers of polyvinyl chloride with vinyl acetate.

A further object is to provide a novel class of dialiphatic esters of alkylidenedibenzoic acids and a process for producing the same.

These and other objects of the present invention will be discussed more fully hereinbelow.

This application is a continuation-in-part of my earlier filed application, Serial No. 523,355, filed July 20, 1955, now U.S. Patent No. 2,848,486, issued August 19, 1958, entitled "4,4'-(2,2-Butylidene)Dibenzoic Acid," in which is disclosed a method for the preparation of the dibenzoic acids from which the dialiphatic esters of the present invention are prepared and the process for preparing the same.

The starting materials used in the preparation of the dicarboxylic acid esters according to the present invention are those acids having the following general formula:

$$\text{HOOC}\underset{}{\underset{}{\bigcirc}}\left[\underset{R'}{\overset{R}{\underset{|}{C}}}\right]_n\underset{}{\bigcirc}\text{COOH}$$

wherein R and R' are alkyl groups containing from 1 to 4 carbon atoms and n is a whole number between 1 and 2, inclusive.

These acids are prepared by oxidizing ditolyl alkanes having the general formula:

$$\text{CH}_3\underset{}{\underset{}{\bigcirc}}\left[\underset{H}{\overset{R}{\underset{|}{C}}}\right]_n\underset{}{\bigcirc}\text{CH}_3$$

These ditolyl alkanes may be prepared by reacting toluene with an aldehyde such as acetaldehyde to form a 1,1-ditolyl alkane such as 1,1-ditolyl ethane, and then reacting said ditolyl ethane with an alkyl halide or with an olefin to produce the desired ditolyl alkane. More details regarding said process steps are set forth hereinbelow, and in my earlier application, referred to hereinabove.

The ditolyl alkanes may be prepared by reacting compounds having the following general formula:

$$\text{CH}_3\underset{}{\underset{}{\bigcirc}}\left[\underset{H}{\overset{R}{\underset{|}{C}}}\right]_n\underset{}{\bigcirc}\text{CH}_3$$

wherein R is hydrogen or an alkyl group containing between 1 and 4 carbon atoms, and wherein n is a whole number between 1 and 2, inclusive, with an olefin having between 2 and 4 carbon atoms, such as ethylene, propylene and butylene, including alpha, beta or isobutylene.

Instead of using an olefin containing between 2 and 4 carbon atoms, compounds of the general formula immediately above could be reacted with alkyl halides having between 1 and 4 carbon atoms, such as methyl iodide or the like, to yield a methyl substituent in place of the hydrogen on the alkane. The total number of moles of methyl halide or olefin used in the reaction will depend on the total number of available hydrogens on the alkanes that are to be replaced.

The following examples are set forth primarily for the purpose of illustrating a method for the preparation of suitable ditolyl alkanes. All parts are by weight.

PREPARATION OF 2,2-DI(P-TOLYL)BUTANE

Into an autoclave there is introduced 105 parts of 1,1-di(p-tolyl)ethane, 5 parts of sodium and 1.5 parts of o-toluic acid. The system is purged with nitrogen gas and then sealed. The autoclave is then heated to about 170° C. and the pressure is released. There is then charged 11.8 parts of ethylene to 900 p.s.i. and the system is closed. The temperature is then maintained at 170° C. with intermittent addition of ethylene until no further pressure drop is experienced. This requires about 6 hours. The autoclave is then cooled and the reaction products are filtered and washed with hexane. The filtrates are combined, washed and distilled. The product produced is 2,2-di(p-tolyl)butane having a boiling point of 196° C. at 20 millimeters of pressure.

PREPARATION OF 3,3-DI(P-TOLYL)PENTANE

The preceding example is repeated in all essential details, except that in the place of 1,1-di(p-tolyl)ethane, there is substituted an equivalent amount of 1,1-di(p-tolyl)propane, and in the place of the o-toluic acid, there is substituted an equivalent amount of o-chlorotoluene. The resultant product is a viscous liquid having a boiling point of 213–220° C. at 15 mm. of mercury. The product is 3,3-di(p-tolyl)pentane.

Among the ditolyl alkanes which may be prepared by a comparable process or by the alkyl halide process and which may be used to produce the acids used in the practice of the process of the present invention are 2,2-di(p-tolyl)propane; 2,2-di(o-tolyl)propane; 2,2-di(m-tolyl)propane; 1,2-di(p-tolyl)-1,1,2,2-tetramethylethane; 1,2-di(p-tolyl)-1,1,2,2-tetraethylethane; 1,2-di(p-tolyl)-1,1,2,2-tetrapropylethane; 1,2-di(p-tolyl)-1,1,2,2-tetrabutylethane; 1,2-diethyl-1,2-dimethyl-1,2-di(p-tolyl)ethane; 1,1,2,2-tetraethyl-1,2-di(o-tolyl)ethane; 1,1,2,2-tetraethyl-1-(o-tolyl)-1-(p-tolylethane; 2,2-di(p-tolyl)butane; 2,2-di(o-tolyl)butane; 2,2-di(m-tolyl)butane; 2,2-di(p-tolyl)pentane; 2-(o-tolyl)-2-(p-tolyl)pentane; 2,2-di(m-tolyl)pentane; 3,3-di(p-tolyl)pentane; 3,3-di(o-tolyl)pentane; 3,3-di(m-tolyl)pentane; 2,2-di(p-tolyl)hexane; 3-(o-tolyl)-3-(m-tolyl)hexane; 3,3-di(p-tolyl)heptane; 3,3-di(o-tolyl)heptane; 4,4-di(p-tolyl)heptane; 4,4-di(p- tolyl)octane; 5,5-di(p-tolyl)nonane; 5 - (o-tolyl)-5-(p-tolyl)nonane; 5,5-di(m-tolyl)nonane, and the like.

Before conversion to the dialkyl esters of the present invention, the ditolyl alkanes described hereinabove are oxidized to corresponding dibenzoic acids. These alkanes may be oxidized under any of the usual oxidizing conditions to form the corresponding dicarboxylic acid. The oxidation may be carried on employing temperatures from room temperature up to about the boiling point of the ditolyl alkane and may be carried out in the presence of any of the well-known oxidizing reagents, such as chromic acid in glacial acetic acid, potassium permanganate in the presence of an alkali, potassium dichromate in the presence of a strong acid such as sulfuric acid, or the oxidation may simply be carried out by flowing air, oxygen or an oxygen-containing gas through the charge. Further, heavy metal catalysts such as the metallic salts of organic acids, such as the cobalt, lead, iron, nickel, manganese, magnesium, and the like salts of acetic acid, propionic acid, oleic, stearic, rosin acids, naphthenic acid, and the like.

The oxidation may be carried out either at atmospheric pressure or super-atmospheric pressure, such as about 3 or 4 atmospheres. The oxidation may be carried out either in the liquid or in the vapor phase. In the vapor phase, the ditolyl alkane would be vaporized and, in being boiled off, would be passed over a fixed bed of a catalyst of the vanadium type. In the vapor phase, there is a possibility of closer control of the contact time, temperature, and the separation of the oxidized material from the unoxidized in a recycling operation. In such an oxidation reaction, it is generally desirable to stop the conversion at about 30 to 40% of the calculated yield in order to avoid side reactions and other complications. The oxidation reaction being stopped at just such a point permits the separation of the dicarboxylic acids thus produced and the recyclization of the ditolyl alkanes.

The lower limit on the reaction temperature of the oxidation reaction is generally considered to be above the melting point of the particular ditolyl alkane selected for oxidation. Still lower temperatures can be utilized if the oxidation is carried out with the ditolyl alkane dispersed or dissolved in a solvent medium. However, the utilization of the solvent medium may well affect the upper limit at which the oxidation can be carried out, inasmuch as the boiling point of the solvent will be one of the controlling factors in the oxidation temperatures. Of course, if super-atmospheric pressure is utilized, the boiling point of the solvent is not a necessary limitation on the temperature of the oxidation reaction. The solvent medium should properly be a material which cannot readily be oxidized under the oxidation conditions of the reaction. Otherwise, complications of mixed end products will be presented. In addition to the oxidations in a solvent medium, dispersions and emulsions may be utilized as the medium for oxidation.

In order that the process for oxidation may be more fully appreciated, the following examples are given primarily by way of illustration. All parts and percentages are by weight unless otherwise indicated.

A.—PROCESS FOR PREPARING 4,4'-(2,2-BUTYLIDENE)DIBENZOIC ACID

Into a suitable reaction vessel equipped with thermometer, stirrer and reflux condenser, there is introduced 10 parts of 2,2-di(p-tolyl)butane, 300 parts of acetic acid, 300 parts of water, 90 parts of concentrated sulfuric acid and 70 parts of chromic acid. The mixture is heated to reflux temperature and maintained at that temperature for about 10 hours. On diluting the reaction mixture with water, 7 parts of a solid material precipitated. After purification by recrystallization from alcohol, this solid material melted at 267° C. uncorrected, and had a neutral equivalent of 150 (theoretical=149). The product produced is identified as 4,4'-(2,2-butylidene)dibenzoic acid.

B.—PROCESS FOR PREPARING 4,4'-(2,2-BUTYLIDENE)DIBENZOIC ACID

Into a suitable autoclave, there is introduced 23.8 parts of 2,2-di(p-tolyl)butane, 30.6 parts of concentrated nitric acid, and 61.0 parts of water. The reactants are heated to 160° C., whereupon the reaction becomes exothermic and the temperature increases to about 190° C. The reactants are held at 170–190° C. for 30 minutes. Thereafter, the charge is cooled to room temperature and the reactants are discharged. The product produced, a light tan solid, is obtained in an 84% yield and melts at about 220–225° C. After several recrystallizations from acetic acid to remove the color impurities, the melting point is raised to 267–268° C. uncorrected. *The analysis.*—calculated for $C_{18}H_{18}O_4$: C, 72.47; H, 6.08; neutral equivalent, 149. Found: C, 72.23; H, 6.14; neutral equivalent, 150.

C.—PROCESS FOR PREPARING 4,4'-(3,3-PENTYLIDENE)DIBENZOIC ACID

Into a suitable autoclave, there is introduced 25.2 parts of 3,3-di(p-tolyl)pentane, 30.6 parts of concentrated nitric acid and 61 parts of water. The reactants are heated to 160° C., whereupon the reaction becomes exothermic and the temperature rises to about 185–190° C. The reactants are held at 175–190° C. for about 30 minutes, whereupon the charge is cooled to room temperature and the reactants discharged. The yield is approximately 87% of theoretical and the product produced is a light tan solid which melts at about 255–285° C. After several recrystallizations from acetic acid, the melting point is determined at 305–306° C., uncorrected. The product produced is 4,4'-(3,3-pentylidene)dibenzoic acid. *Analysis.*—Calculated for $C_{19}H_{20}O_4$: C, 73.06; H, 6.45; neutral equivalent, 156. Found: C, 73.11; H, 6.65; neutral equivalent, 153.

D.—PROCESS FOR PREPARING 4,4'-(1,1,2,2-TETRAMETHYLETHYLENE)DIBENZOIC ACID

Into a suitable reaction vessel equipped as in Example A, there is introduced 20 parts of 1,1,2,2-tetramethyl-1,2-di(p-tolyl) ethane, 600 parts of acetic acid, 600 parts of water, 140 parts of chromic acid and 180 parts of sulfuric acid. The charged mixture is heated at the reflux temperature for about 22 hours. Dilution of the system with water caused 20 parts of a solid material to precipitate, which had a neutral equivalent of 113. The crude solid which precipitated was treated with alkali yielding two fractions; the first fraction (A) was soluble in cold alkali, whereas the second fraction (B) was soluble in hot alkali. The latter fraction (B) on acidification, gave a solid acid which, after purification by crystallization from acetic acid, melted at 218–219° C. uncorrected. The analysis and infrared spectrum on this material are compatible with the monobasic acid having the following formula: 1,1,2,2-tetramethyl-1-(p-tolyl)-2-(p-carboxyphenyl)-ethane. *Analysis.*—Calculated for $C_{20}H_{24}O_2$: C, 81.04; H, 8.16; —COOH, 15.19. Found: C, 81.30; H, 8.23; —COOH, 14.88. The acidification of Fraction A produced a white solid material having a melting point greater than 300° C. The material was found to be 4,4'-(1,1,2,2-tetramethylethylene)dibenzoic acid.

E.—PROCESS FOR PREPARING 4,4'-(1,1,2,2-TETRAETHYLETHYLENE)DIBENZOIC ACID

Example A is repeated in substantially all details, except that the ditolyl alkane used as a starting material is 1,1,2,2-tetraethyl-1,2-di(p-tolyl)ethane and the dicarboxylic acid produced is 4,4'-(1,1,2,2-tetraethylethylene)dibenzoic acid.

F.—PROCESS FOR PREPARING 4,4'-(1,2-DIETHYL-1,2-DIMETHYLETHYLENE)DIBENZOIC ACID

Example A is repeated in substantially all essential details, except that the ditolyl alkane which is oxidized is 1,2 - diethyl-1,2-dimethyl-1,2-di(p-tolyl)ethane. The acid produced is 4,4'-(1,2-diethyl-1,2-dimethylethylene) dibenzoic acid.

G.—PROCESS FOR PREPARING 4,4'-ISOPROPYLIDENEDIBENZOIC ACID

Example A is repeated in all essential details, except that the ditolyl alkane which is oxidized is 2,2-di(p-tolyl) propane and the corresponding acid is produced, namely, 4,4'-isopropylidenedibenzoic acid.

Among the dicarboxylic acids which may be prepared for use in accordance with the concepts of the present invention are 4,4'-isopropylidenedibenzoic acid; 4,4'-(2,2-butylidene)dibenzoic acid; 4,4'-(1,1,2,2-tetramethylethylene)dibenzoic acid; 4,4' - (1,1,2,2 - tetraethylethylene)dibenzoic acid; 4,4' - (1,1,2,2-tetrapropylethylene)-dibenzoic acid; 4,4' - (1,1,2,2 - tetrabutylethylene)dibenzoic acid; 3,3'-isopropylidenedibenzoic acid; 2,2' - isopropylidenedibenzoic acid; 4,4'-(1,2-diethyl-1,2-dimethylethylene)dibenzoic acid; 2,4' - (1,1,2,2 - tetraethylethylene)dibenzoic acid; 2,3'-(1,1,2,2-tetrabutylethylene)dibenzoic acid; 3,4'-(2,2-butylidene)dibenzoic acid; 3,3'-(2,2-butylidene)dibenzoic acid; 2,,4'-(2,2-butylidene)dibenzoic acid; 4,4'-(2,2-pentylidene)dibenzoic acid; 3,3'-(2,2-pentylidene)dibenzoic acid; 2,2'-(2,2-pentylidene)-dibenzoic acid; 4,4'-(3,3-pentylidene)dibenzoic acid; 3,3'-(3,3-pentylidene)dibenzoic acid; 2,4'-(3,3-pentylidene)-dibenzoic acid; 4,4'-(2,2-hexylidene)dibenzoic acid; 3,3'-(2,2-hexylidene)dibenzoic acid; 2,2'-(2,2-hexylidene)dibenzoic acid; 4,4'-(3,3-hexylidene)dibenzoic acid; 4,4'-(3,3-heptylidene)dibenzoic acid; 3,4'-(3,3-heptylidene)-dibenzoic acid; 4,4'-(4,4-heptylidene)dibenzoic acid; 4,4' - (4,4 - octylidene)dibenzoic acid; 3,3' - (4,4 - octylidene)dibenzoic acid; 2,3'-(4,4-octylidene)dibenzoic acid; 4,4' - (5,5 - nonylidene)dibenzoic acid; 3,3'-(5,5 - nonylidene)dibenzoic acid; and 2,4'-(5,5-nonylidene)dibenzoic acid.

The conversions of the dibenzoic acids to corresponding dialkyl esters may be generally accomplished by co-reacting a suitable dibenzoic acid with an esterifying alcohol or alcohols, with or without the addition of additional solvent as, for example, known hydrocarbon solvents, such as xylene or the like, and with or without the aid of suitable catalysts, an example of which is p-toluene sulfonic acid. The esterifying alcohols of the present invention may be either saturated or unsaturated monohydric aliphatic alcohols containing from 1 to 18 carbon atoms, and preferably containing from between 4 and 12 carbon atoms. Examples of such alcohols include methanol, ethanol, propanol, butanol, amyl alcohol, hexyl alcohol, heptyl alcohol, octyl alcohol, nonyl alcohol, decyl alcohol, undecyl alcohol, dodecanol alcohol, tridecanol alcohol, stearyl alcohol, and the like.

Among the unsaturated aliphatic monohydric alcohols that may be employed are allyl, crotyl, oleyl, linoleyl, linolenyl alcohol, and the like.

These alcohols may be used singly to produce dihomoalkyl esters, or in combination with one another to produce mixed esters, and in many instances, particularly where one of the alcoholic members contains a long aliphatic group such as, for example, stearyl alcohol, it appears highly desirable that a second alcohol be a short-chain aliphatic alcohol as, for example, ethanol.

Additionally, the aliphatic chains of the alcohols employed in this invention may be broken and contain one or more ether oxygens and/or one or more sulfide (—S—) groups. Examples of the former are 2-methoxy ethanol; 2-ethoxy ethanol; 2-isopropoxy ethanol; 2-butoxy ethanol; 2-n-hexyloxy ethanol; 2-(2-methoxy ethoxy)ethanol; 2-(2 - ethoxy ethoxy)ethanol; 2 - (2- butoxy ethoxy)ethanol; 2 - [2 - (2 - methoxy ethoxy)-ethoxy]ethanol; 2-[2-(2-ethoxy ethoxy)ethoxy]ethanol; and 2-(2-hexyloxy ethoxy)ethanol. Examples of alcohols having the sulfide group in the aliphatic chain include 2-(methyl thio)ethanol; 2-(butyl thio)ethanol; and 2-(2-methyl thio ethyl thio)ethanol, and the like.

As will be noted, the term "dialiphatic ester" is intended to include both saturated and unsaturated aliphatic monohydric alcohols, whether alkyl, alkenyl, or other.

The following examples, relating to a process for making suitable dialkyl esters within the meaning of the present invention, are provided primarily for purposes of illustration. No specific details found therein should be construed as a limitation on the present invention, except as they appear in the appended claims. All parts and percentages are by weight unless otherwise indicated.

Example 1

Into a suitable reaction vessel, there is introduced 2 parts of 4,4'-isopropylidenedibenzoic acid, dissolved in about 100 parts of methanol. The solution is saturated with dry hydrochloric acid. After standing at room temperature overnight, the methanol is removed by evaporation, leaving a solid residue amounting to 2.2 parts, representing a 92% yield. This solid residue melted at 107–107.5° C. after several recrystallizations from methanol. *Analysis.*—Calculated for $C_{19}H_{20}O_4$: C, 73.08; H, 6.41. Found: C, 72.83; H, 6.80. The product is identified as the dimethyl ester of 4,4'-isopropylidenedibenzoic acid.

Example 2

Into a suitable reaction vessel, there is introduced 3.6 parts of 4,4'-(2,2-butylidene)dibenzoic acid dissolved in 45 parts of hot methanol. The solution is saturated with anhydrous hydrogen chloride. After permitting the charge to stand overnight at room temperature, 3.0 parts of colorless crystalline solid is precipitated, representing a yield of 76%. The product melts at 87–88° C. After several recrystallizations from hot methanol, the melting point is raised to a constant value of 89–90° C. *Analysis.*—Calculated for $C_{20}H_{22}O_4$: C, 73.60; H, 6.80. Found: C, 73.73; H, 6.88. The product is identified as the dimethyl ester of 4,4'-(2,2-butylidene) dibenzoic acid.

Example 3

Into a suitable reaction vessel, there is introduced 1 part of 4,4'-(3,3-pentylidene)dibenzoic acid dissolved in 50 parts of methanol. Anhydrous hydrogen chloride is passed into this solution until 8 parts of HCl has been absorbed. The solution is then concentrated to a net weight of 20 parts by boiling on a steam bath. On cooling, 0.95 part of a colorless solid is precipitated in needle-like form, representing a yield of 87%. The melting point of this solid material is 83–85° C. After several recrystallizations from hot methanol, the melting point remained constant at 85° C. *Analysis.*—Calculated for: $C_{21}H_{24}O_4$: C, 74.09; H, 7.12. Found: C, 73.83; H, 7.03. The product is identified as the dimethyl ester of 4,4'-(3,3-pentylidene)dibenzoic acid.

Example 4

Into a suitable reaction vessel, there is introduced 2 parts of 4,4'-(1,1,2,2-tetramethylethylene)dibenzoic acid dissolved in 200 parts of methanol. This is treated with anhydrous hydrogen chloride. The methanol solution is concentrated to produce 2.8 parts of colorless prisms having a melting point of 218° C. After several recrystallizations from methanol, the melting point remained unchanged. The analysis and infrared spectrum of this material are compatible with the compound, dimethyl-4,4' - (1,1,2,2 - tetramethylethylene)dibenzoate. *Analysis.*—Calculated for $C_{22}H_{26}O_4$: C, 74.55; H, 7.40; saponification No. 177. Found: C, 74.47; H, 7.59; saponification No. 172. The product is identified as the dimethyl ester of 4,4'-(1,1,2,2-tetramethylethylene) dibenzoic acid.

*Example 5*

Into a suitable reaction vessel, a mixture of 55 parts of 4,4'-(2,2-butylidene)dibenzoic acid, and 185 parts of 2-ethyl hexanol are placed. This mixture is heated at a temperature of from 185 to 200° C. until esterification is essentially completed. The water of esterification is removed azeotropically during the esterification. The excess alcohol is then stripped off under vacuum.

The residue is dissolved in ether and the ether solution is passed over an activated alumina column, which removes substantially all of the colored impurities and substantially all of the acidic materials.

Thereafter, the ether was evaporated and 72 parts of a light yellow liquid having an acid number less than 1 was obtained. The product is identified as the di-2-ethyl hexyl ester of 4,4'-(2,2-butylidene)dibenzoic acid.

*Example 6*

The same general procedure of Example 5 was employed here, except that 55 parts of 4,4'-(3,3-pentylidene)dibenzoic acid and 177 parts of 2-ethyl hexanol were employed. The product obtained was a light yellow oil having an acid number of less than 1. The product is identified as the di-2-ethyl hexyl ester of 4,4'-(3,3-pentylidene)dibenzoic acid.

*Example 7*

The same procedure as in Example 5 was employed, except that 110 parts of 4,4'-isopropylidenedibenzoic acid and 380 parts of 2-ethyl hexanol were employed. The product obtained was a light yellow oil having an acid number of less than 1. The product is identified as the di-2-ethyl hexyl ester of 4,4'-isopropylidenedibenzoic acid.

*Example 8*

The same general procedure as that set forth in Example 5 is followed, except that in place of the 2-ethyl hexanol, about 180 parts of n-octanol was employed. A light yellow oil having an acid number of less than 1 was obtained. The product is identified as the dioctyl ester of 4,4'-(2,2-butylidene)dibenzoic acid.

*Example 9*

The same general procedure set forth in Example 5 was employed, except that the 2-ethyl hexanol was replaced with 200 parts of decanol. A light yellow liquid having an acid number of less than 1 was obtained. The product is identified as the didecyl ester of 4,4'-(2,2-butylidene)dibenzoic acid.

*Example 10*

The same general procedure used in Example 5 was employed here, except that the 2-ethyl hexanol was replaced with 210 parts of tridecanol. The product obtained was a light oily liquid having an acid number less than 1. The product is identified as the di-tridecyl ester of 4,4'-(2,2-butylidene)dibenzoic acid.

*Example 11*

The same general procedure used in Example 5 was employed here, except that the acid was replaced with 55 parts of 4,4'-(1,1,2,2-tetramethylethylene dibenzoic acid.

*Example 12*

Into a suitable reaction vessel, 235 parts of 4,4'-(2,2-butylidene)dibenzoic acid, 1880 parts of butanol, 200 parts of xylol, and 3 parts of p-toluene sulfonic acid are placed. This mixture is then refluxed for 20 hours, during which time the water of esterification is removed azeotropically.

Thereafter, excess butanol and xylol are removed, and the residue is washed free of acidic material with a sodium bicarbonate solution. The oily residue is distilled to produce an almost colorless oil in essentially quantitative yield. The product is identified as the dibutyl ester of 4,4'-(2,2-butylidene)dibenzoic acid.

*Example 13*

Into a suitable reaction vessel, there is placed 55 parts of 4,4'-(2,2-butylidene)dibenzoic acid, 185 parts of 2-isopropoxyethanol, and 20 parts of xylol. This reaction mixture is refluxed, and the water of esterification is removed azeotropically.

Thereafter, the reaction product is processed according to the general procedure set forth in Example 5.

*Example 14*

Into a suitable reaction vessel, there is placed 55 parts of 4,4'-(2,2-butylidene)dibenzoic acid, 100 parts of butanol, 100 parts of octanol, 0.5 part of p-toluene sulfonic acid, and 20 parts of xylene. This mixture is refluxed until esterification is essentially complete. Thereafter, the water of esterification is removed azeotropically and the general procedure of Example 5 is employed. The product is a mixture of the dibutyl and dioctyl esters and the mono-butyl and mono-octyl esters of 4,4'-(2,2-butylidene)dibenzoic acid.

*Example 15*

Into a suitable reaction vessel, 55 parts of 4,4'-(2,2-butylidene)dibenzoic acid, 120 parts of allyl alcohol, 20 parts of xylene, and 0.5 part of p-toluene sulfonic acid are placed. The reaction mixture is refluxed until esterification is complete. The water of esterification is removed azeotropically and the acid catalyst is removed by washing the material with dilute sodium carbonate solution.

The excess alcohol and xylene is removed by vacuum distillation. The resulting product is a light yellow oil.

Among the dialkyl esters which may be prepared in accordance with the concept of the present invention are the dimethyl ester of 4,4'-isopropylidenedibenzoic acid; the diethyl ester of 4,4'-(2,2-butylidene)dibenzoic acid; the dietridecanol ester of 4,4'-(2,2-butylidene)dibenzoic acid; the diallyl ester of 4,4'-(2,2-butylidene)dibenzoic acid; the butyl-octyl ester of 4,4'-(2,2-butylidene)dibenzoic acid; the diethyl ester of 4,4'-(1,1,2,2-tetramethylethylene)dibenzoic acid; the dioctyl ester of 4,4'-(1,1,2,2-tetraethylethylene)dibenzoic acid; the diamyl ester of 4,4' - (1,1,2,2 - tetrapropylethylene)dibenzoic acid; the methyltridecanol ester of 4,4'-(1,1,2,2-tetrabutyleneethylene)dibenzoic acid; the dihexyl ester of 3,3'-isopropylidenedibenzoic acid; the diheptyl ester of 2,2'-isopropylidenedibenzoic acid; the dioctyl ester of 4,4'-(1,2-diethyl-1,2-dimethyl-ethylene)dibenzoic acid; the dinonyl ester of 2,4'-(1,1,2,2-tetraethylethylene)dibenzoic acid; the dibutyl ester of 2,3'-(1,1,2,2-tetrabutylene-ethylene) dibenzoic acid; the dioctyl ester of 4,4'-(2,2-butylidene)dibenzoic acid; the didecyl ester of 3,3'-(2,2-butylidene)dibenzoic acid; the diethyl ester of 2,4'-(2,2-butylidene)-dibenzoic acid; the dipropyl ester of 4,4'-(2,2-pentylidene)dibenzoic acid; the diisopropyl ester of 3,3'-(2,2-pentylidene)dibenzoic acid; the diisobutyl ester of 2,4-(2,2-pentylidene)dibenzoic acid; the dihexyl ester of 4,4'-(3,3-pentylidene)dibenzoic acid; the dioctyl ester of 3,4'-(3,3-pentylidene)dibenzoic acid; the diheptyl ester of 2,3'-(3,3-pentylidene)dibenzoic acid; the diamyl ester of 4,4'-(2,2-hexylidene) dibenzoic acid; the dimethyl ester of 3,3'-(2,2-hexylidene)dibenzoic acid; the dioctyl ester of 2,2'-(2,2-hexylidene)dibenzoic acid; the dinonyl ester of 4,4'-(3,3-hexylidene)dibenzoic acid; the dipropyl ester of 4,4'-(3,3-heptylidene)dibenzoic acid; the diheptyl ester of 3,4'-(3,3-heptylidene)dibenzoic acid; the dioctyl ester of 4,4'-(4,4-heptylidene)dibenzoic acid; the dibutyl ester of 4,4'-(4,4-octylidene)dibenzoic acid; the diamyl ester of 3,3'-(4,4-octylidene) dibenzoic acid; the dioctyl ester of 2,4'-(4,4-octylidene)dibenzoic acid; the ethyl-decyl ester of 4,4'-(5,5-nonylidene)dibenzoic acid; the dioctyl ester of 3,3'-(5,5-nonylidene)dibenzoic acid; and the dipropyl ester of 2,3'-(5,5-nonylidene)dibenzoic acid.

One of the principal end uses for the dialkyl ester of the dicarboxylic acids of this invention will be in the field of plasticizing resinous materials such as vinyl esters and, more specifically, polyvinyl chloride and copolymers of vinyl chloride and vinyl acetate.

The following examples illustrate the effectiveness of these esters for polyvinyl chloride.

*Example 16*

100 parts of polyvinyl chloride and 50 parts of a dibutyl ester of 4,4'-(2,2-butylidene)dibenzoic acid were blended together and fluxed on hot mill rolls. The mill temperature was about 150° and the mill time was about 10 minutes. After that period, a sheet is removed from the roll, which has a leathery feeling, but is fairly brittle at room temperature.

*Example 17*

100 parts of a copolymer comprised of 50% vinyl chloride and 50% vinyl acetate, and 50 parts of the dioctyl ester of 4.4'-(3,3-pentylidene)dibenzoic acid were blended together and fluxed on hot mill rolls. The mill temperature was 150° and the time was 10 minutes. After that period, a sheet is removed from the mill, which has a leathery feeling, but is brittle at room temperature.

*Example 18*

100 parts of polyvinyl chloride and 50 parts of a mixed dialkyl (butanol-octanol) ester of 4,4'-(2,2-butylidene)-dibenzoic acid are blended and fluxed on hot mill rolls at a temperature of 130° C. for 30 minutes. A plasticized sheet of polyvinyl chloride is removed from the mill roll.

*Example 19*

100 parts of polyvinyl chloride and 100 parts of the dipentyl ester of 4,4'-(3,3-pentylidene)dibenzoic acid are blended and fluxed on hot mill rolls at a temperature of about 150° C. for 6 minutes. The resulting sheet is flexible and has a rubbery feeling.

The esters of the present invention may be employed as plasticizers, for the most part, wherever the more conventional dioctyl phthalate esters may be employed, and it has been observed that in certain instances, when so employed, heat transfer or loss is significantly less than when these conventional dioctyl phthalates are employed.

In plasticizing the polymers of vinyl chloride, or copolymers of vinyl chloride and vinyl acetate or nitrocellulose lacquers, the amount of alkyl ester of the dibenzoic acids which may be used can be varied over substantial limits, depending upon the degree of plasticizing desired. As the amount of ester is increased, the greater the plasticity of the resulting sheet. For example, between 5 and 200 parts of these dialkyl esters per 100 parts of vinyl resin may be employed. For most applications, a somewhat narrower range of the order of between about 50 and 150 parts of these dialkyl esters per 100 parts of polymer may be employed.

Additionally, it should be noted that according to the present invention half esters of these dibenzoic acids may be prepared, which may be used as intermediates in the formation of metallic soaps, and the like.

Obviously, other additives may be used which are not inconsistent with the plasticizing activity of the diesters, such as dyes and/or pigments, opacifiers, fillers, and the like, may be incorporated into the vinyl resin, along with the plasticizer.

It should be noted that in the case of unsaturated aliphatic esters of the dibenzoic acids disclosed hereinabove, as for example, the monoallyl and diallyl esters, that these materials may be homopolymerized, inter or copolymerized with other polymerizable vinylidene compounds containing a $CH_2=C<$ group and/or with other unsaturated polyester resins.

I claim:
1. A composition of matter comprising a member selected from the group consisting of a copolymer of vinyl chloride and vinyl acetate, and polyvinyl chloride and a dialiphatic ester of an acid having the following general formula:

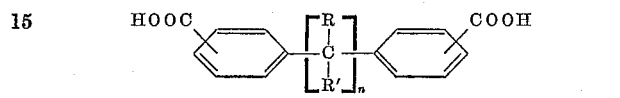

wherein R and R' are alkyl groups containing from 1 to 4 carbon atoms and $n$ is a whole number between 1 and 2, inclusive and wherein the alcohol from which said ester is derived is an aliphatic monohydric alcohol containing from 4 to 18 carbon atoms.

2. A composition according to claim 1 wherein the dialiphatic ester is a dihomoaliphatic ester.

3. A composition of matter comprising a copolymer of vinyl chloride and vinyl acetate, and a dialiphatic ester of an acid having the following general formula:

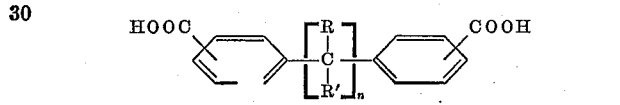

wherein R and R' are alkyl groups containing from 1 to 4 carbon atoms and $n$ is a whole number between 1 and 2, inclusive and wherein the alcohol from which said ester is derived is an aliphatic monohydric alcohol containing from 4 to 18 carbon atoms.

4. A composition of matter comprising polyvinyl chloride and a dialiphatic ester of 4,4'-(2,2-butylidene)dibenzoic acid wherein the alcohol from which said ester is derived is an aliphatic monohydric alcohol containing from 4 to 18 carbon atoms.

5. A composition of matter comprising a copolymer of vinyl chloride and vinyl acetate and a dialiphatic ester of 4,4'-(2,2-butylidene)dibenzoic acid wherein the alcohol from which said ester is derived is an aliphatic monohydric alcohol containing from 4 to 18 carbon atoms.

6. A composition of matter comprising polyvinyl chloride and the dibutyl ester of 4,4'-(2,2-butylidene)dibenzoic acid.

7. A composition of matter comprising polyvinyl chloride and the diamyl ester of 4,4'-(2,2-butylidene)dibenzoic acid.

8. A composition of matter comprising polyvinyl chloride and the dioctyl ester of 4,4'-(2,2-butylidene)dibenzoic acid.

9. A composition of matter comprising polyvinyl chloride and the didecyl ester of 4,4'-(2,2-butylidene)dibenzoic acid.

10. A composition of matter comprising polyvinyl chloride and the ditridecyl ester of 4,4'-(2,2-butylidene)dibenzoic acid.

References Cited in the file of this patent
UNITED STATES PATENTS

| | | |
|---|---|---|
| 2,157,697 | Hagedorn | May 9, 1939 |
| 2,794,822 | Schweitzer | June 4, 1957 |